United States Patent
De Lorenzo et al.

(10) Patent No.: US 7,868,819 B2
(45) Date of Patent: Jan. 11, 2011

(54) ARRANGEMENTS FOR SATELLITE-BASED NAVIGATION AND METHODS THEREFOR

(75) Inventors: David De Lorenzo, Palo Alto, CA (US); Per Enge, Mountain View, CA (US)

(73) Assignee: The Board of Trustees of the Leland Stanford Junior University, Palo Alto, CA (US)

(*) Notice: Subject to any disclaimer, the term of this patent is extended or adjusted under 35 U.S.C. 154(b) by 315 days.

(21) Appl. No.: 12/205,521

(22) Filed: Sep. 5, 2008

(65) Prior Publication Data

US 2009/0066574 A1 Mar. 12, 2009

Related U.S. Application Data

(60) Provisional application No. 60/970,801, filed on Sep. 7, 2007.

(51) Int. Cl.
G01S 1/00 (2006.01)
H04B 7/185 (2006.01)

(52) U.S. Cl. ............... 342/357.12; 375/232; 375/150; 375/350; 375/148; 375/346; 342/357.65; 342/357.02

(58) Field of Classification Search ............. 342/357.12
See application file for complete search history.

(56) References Cited

U.S. PATENT DOCUMENTS

| | | | | |
|---|---|---|---|---|
| 5,311,546 A * | 5/1994 | Paik et al. | ................ | 375/232 |
| 5,943,363 A * | 8/1999 | Hanson et al. | ............ | 375/150 |
| 6,456,608 B1 * | 9/2002 | Lomp | ................ | 370/335 |
| 6,735,427 B2 * | 5/2004 | Higbie | ................ | 455/278.1 |
| 6,885,940 B2 * | 4/2005 | Brodie et al. | ............ | 701/213 |
| 6,952,460 B1 * | 10/2005 | Van Wechel et al. | ....... | 375/350 |
| 7,120,657 B2 * | 10/2006 | Ricks et al. | ............ | 708/322 |
| 7,274,504 B2 * | 9/2007 | Crane et al. | ............ | 342/357.65 |
| 7,295,636 B2 * | 11/2007 | Onggosanusi et al. | ....... | 375/346 |
| 7,415,065 B2 * | 8/2008 | Sud et al. | ............ | 375/230 |
| 7,471,744 B2 * | 12/2008 | Van Wechel et al. | ....... | 375/316 |
| 7,714,782 B2 * | 5/2010 | Davis et al. | ............ | 342/377 |
| 2005/0195103 A1 * | 9/2005 | Davis et al. | ............ | 342/99 |
| 2005/0254557 A1 * | 11/2005 | Ozluturk et al. | ............ | 375/148 |
| 2007/0173195 A1 * | 7/2007 | Widrow | ................ | 455/3.05 |
| 2007/0252754 A1 * | 11/2007 | Alexander | ............ | 342/357.02 |

(Continued)

OTHER PUBLICATIONS

De Lorenzo et al. "Adaptive Array Processing for GPS Interference Rejection." Presentation, Institute of Navigation's GNSS Conference, Long Beach, CA, 10 pgs. (Sep. 2005).

(Continued)

*Primary Examiner*—Thomas H Tarcza
*Assistant Examiner*—Frank McGue
(74) *Attorney, Agent, or Firm*—Crawford Maunu PLLC

(57) ABSTRACT

Various systems, methods and devices are implemented for processing received signals. Consistent with one such embodiment, a method is implemented for use in a signal-communication receiver having a carrier-tracking loop and a processor for operating adaptive algorithms. The method involves interpreting a received signal using space time adaptive processing (STAP). A convergence speed of the adaptive algorithms is set based on a noise bandwidth of a phase-locked loop (PLL) in the carrier-tracking loop. A carrier-phase de-rotation constraint is implemented into weight parameters of the STAP to preserve spatial and temporal degrees of freedom in the STAP.

18 Claims, 5 Drawing Sheets

U.S. PATENT DOCUMENTS

2007/0263748 A1* 11/2007 Mesecher .................. 375/299
2008/0025446 A1* 1/2008 Van Wechel et al. ........ 375/350

OTHER PUBLICATIONS

De Lorenzo et al. "Testing of Adaptive Beamsteering for Interference Rejection in GNSS Receivers." Presentation, European Navigation Conference GNSS/TimeNav 2007, Geneva, Switzerland, 11 pgs (May 2007).

De Lorenzo et al. "GPS Receiver Architecture Effects on Controlled Reception Pattern Antennas for JPALS." Presentation, Institute of Navigation's GNSS Conference, Long Beach, CA, 11 pgs. (Sep. 2004).

De Lorenzo. "Navigation Accuracy and Interference Rejection for GPS Adaptive Antenna Arrays." A Dissertation submitted by David S. De Lorenzo to Stanford University for the Degree of Doctor of Philosophy, Stanford, CA, 125 pgs. (Aug. 2007). Part of Provisional Application.

De Lorenzo et al. "Navigation Interference and Interference Rejection for an Adaptive GPS Antenna Array." Presentation, ION Institute of Navigation, Global Navigation Satellite Systems Conference, Fort Worth, TX, 11 pgs. (Sep. 2006).

Fante et al. "Effect of Adaptive Array Processing on GPS Signal Crosscorrelation." Proc. ION GNSS 2004, pp. 579-583 (2004).

Hamm et al. "Comparative Performance Analysis of Aided Carrier Tracking Loop Algorithms in High Noise/High Dynamic Environments." Proc. ION GNSS 2004, 10 pgs. (2004).

Lu et al. "Survey on Interference Mitigation via Adaptive Array Processing in GPS." Progress in Electromagnetics Research Symposium, Cambridge, MA, pp. 357-362 (Mar. 26-29, 2006).

Trinkle et al. "GPS Interference Mitigation; Overview and Experimental Results." Proc. Of the $5^{th}$ Int'l Symposium on Satellite Navigation Technology & Applications, Canberra, Australia,14 pgs. (2001).

John A. Volpe Nat'l Transportation Systems Center. "Final Report: Vulnerability Assessment of the Transportation Infrastructure Relying on the Global Positioning Systems." Prepared for the U.S. Dept. of Transportation, Washington, DC, 113 pgs. (Aug. 29, 2001).

Zhao et al. "A Simulation Tool for Space-Time Adaptive Processing in GPS." Progress in Electromagnetics Research Symposium, Cambridge, MA, pp. 363-367 (Mar. 26-29, 2006).

* cited by examiner

ARRANGEMENTS FOR SATELLITE-BASED NAVIGATION AND METHODS THEREFOR

RELATED PATENT DOCUMENTS

This patent document claims the benefit, under 35 U.S.C. §119(e), of U.S. Provisional Patent Application Ser. No. 60/970,801, entitled Arrangements For Satellite-Based Navigation And Methods Therefor and filed on Sep. 7, 2007; this provisional patent application, including the Appendix therein, is fully incorporated herein by reference.

FEDERALLY-SPONSORED RESEARCH OR DEVELOPMENT

This invention was made with Government support under contract N00421-05-C-0068 awarded by the Naval Air Warfare Center. The Government has certain rights in this invention.

FIELD OF THE INVENTION

The present invention relates generally to satellite-based navigation arrangements and methods.

BACKGROUND

Satellite-based navigation systems provide position information for a variety of applications. The position information is determined with respect to distances between receivers and transmitters. GNSS (Global Navigational Satellite System) such as Global Positioning System (GPS)/Navstar or GLONASS provide specific examples of satellite-based navigations. In particular, GPS includes a number of geo-synchronous satellites that simultaneously transmit signals. A GPS receiver determines its position by computing the relative times of arrival (TOA) of simultaneous signals. GPS satellites transmit ephemeris data that includes satellite positioning data and timing data. The timing data is used to synchronize the receiver's clock to the clock of the satellite. This allows for the use of less accurate clocks by the receiver. The satellite positioning data includes two positioning components, a code-based component and a carrier-frequency-based component. GPS receivers determine the position of the receiver by comparing locally generated code and/or carrier components using the timing data. The locally generated components are values measured against the received signal from each satellite to determine the signal delay due to the distance from each satellite.

The GPS satellites transmit at two carrier frequencies called L1 and L2. These carrier frequencies carry a pseudorandom (PRN) code or PN sequence that is known by the receivers and that is implemented by spread spectrum modulation of the carrier frequencies. The receiver identifies the transmitting satellite based upon the PN sequence. Satellite signals from several satellites are received, separated and decoded using the code division multiple access (CDMA) data transmission technique.

The PRN codes are sometimes described in terms of chipping or chip rates. The terms chip and chipping are used in place of the term bits. Chipping is generally used to denote instances where the bits are not used to directly convey data (i.e., because the receiver already knows the PRN code).

Generally a receiver must identify, or detect, the satellite's transmission. To do so a receiver performs a correlation process that includes multiplying the received signal by a locally generated code generated from a stored code and local clock. The result is integrated to detect the receipt of a satellite's transmission. This integration step is sometimes referred to as an integrate-and-dump procedure. Adjusting the timing of the locally generated code relative to the received signal provides a mechanism for determining the time delay between the received signal and the local clock through an observation of the integrate and dump output. This determination is also referred to as acquisition of the satellite's signal. After signal acquisition, the timing of the locally generated code is maintained synchronous to the received satellite signal.

The chip rate of civilian codes is slow with respect to the speed of the signal (e.g., at or near the speed of light) and distance between the satellite(s) and receiver. This results in an inaccurate position determination. Accordingly, some GPS receivers also determine the carrier phase of the transmitted signals. GPS receivers accomplish carrier-phase acquisition and tracking by generating a local signal having the expected carrier frequency. This local signal can be generated so as to include Doppler shifts to the carrier frequency. Once this local signal has been synchronized to the received signal, the receiver operates by adjusting (tracking) the carrier-phase to maintain synchronous operation. Such adjustments to the code-phase and carrier-phase of the locally generated signals (for the purpose of tracking the received signals) are sometimes referred to as code wipeoff and carrier wipeoff, respectively.

Using the abovementioned GPS provides typical accuracies of meters in position and nanoseconds in time. These accuracies allow for the use of GPS in critical technology, such as for aviation, where safety-of-life requires strict limits on navigation errors. However, aviation authorities have not certified GPS as a primary means of navigation for landing operations due to reliability concerns. A specific aviation objective is the use of GPS for autonomously controlled landings. Fully-automated GPS landings depend upon high levels of outside assistance and performance validation. An important research area in both civil and military aviation is ensuring GPS accuracy and integrity during final approach and landing. A significant challenge to landing with GPS, particularly for military users, is to reject radio frequency interference, which can jam reception of the GPS signals. Among the aggressive anti-jam technologies is the multi-element antenna array equipped with adaptive beamforming and nullsteering. Antenna arrays that use space-time adaptive processing can improve the signal to interference plus noise ratio (SINR). This spatial and temporal filtering can, however, introduce time-varying biases into the GPS measurements.

A challenge to implementing a GPS adaptive antenna array is the rejection of interference while limiting or mitigating navigation biases. First, strict limits on code-phase and carrier-phase biases have been identified in order to meet accuracy and integrity requirements. Second, there is a need for space-time adaptive antenna arrays in order to meet interference rejection requirements. However, there is a conflict between integrity-driven bias requirements and the requirement to reject interference through use of an adaptive antenna array.

These and other problems have presented challenges to the implementation of satellite navigation systems.

SUMMARY

The present invention is exemplified in a number of implementations and applications, including embodiments directed to addressing the above-mentioned issues, some of which are summarized below.

Consistent with one embodiment of the present invention that is for use in a signal-communication receiver having a carrier-tracking loop and a processor for operating adaptive algorithms, a method is implemented for interpreting a received signal using space time adaptive processing (STAP). A convergence speed of the adaptive algorithms is set based on a noise bandwidth of a phase-locked loop (PLL) in the carrier-tracking loop. A carrier-phase de-rotation constraint is implemented into weight parameters of the STAP to preserve spatial and temporal degrees of freedom in the STAP.

Another embodiment of the present invention is directed to a signal-communication receiver having a carrier-tracking loop and a processor operating adaptive algorithms for interpreting a received signal using space time adaptive processing (STAP). The receiver has a processing block that implements the adaptive algorithms using a convergence speed that is based on a noise bandwidth of a phase-locked loop (PLL) in the carrier-tracking loop and that implements a carrier-phase de-rotation constraint into weight parameters of the STAP to preserve spatial and temporal degrees of freedom in the STAP.

Consistent with another embodiment of the present invention that is for use in a signal-communication receiver having a carrier-tracking loop and a processor for operating adaptive algorithms, a computer-readable storage medium is configured with software that when executed by a processor implements a method for interpreting a received signal using space time adaptive processing (STAP). The method includes both setting a convergence speed of the adaptive algorithms based on a noise bandwidth of a phase-locked loop (PLL) in the carrier-tracking loop; and implementing a carrier-phase de-rotation constraint into weight parameters of the STAP to preserve spatial and temporal degrees of freedom in the STAP.

The above summary is not intended to describe each illustrated embodiment or every implementation of the present invention. The figures, detailed description and claims that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
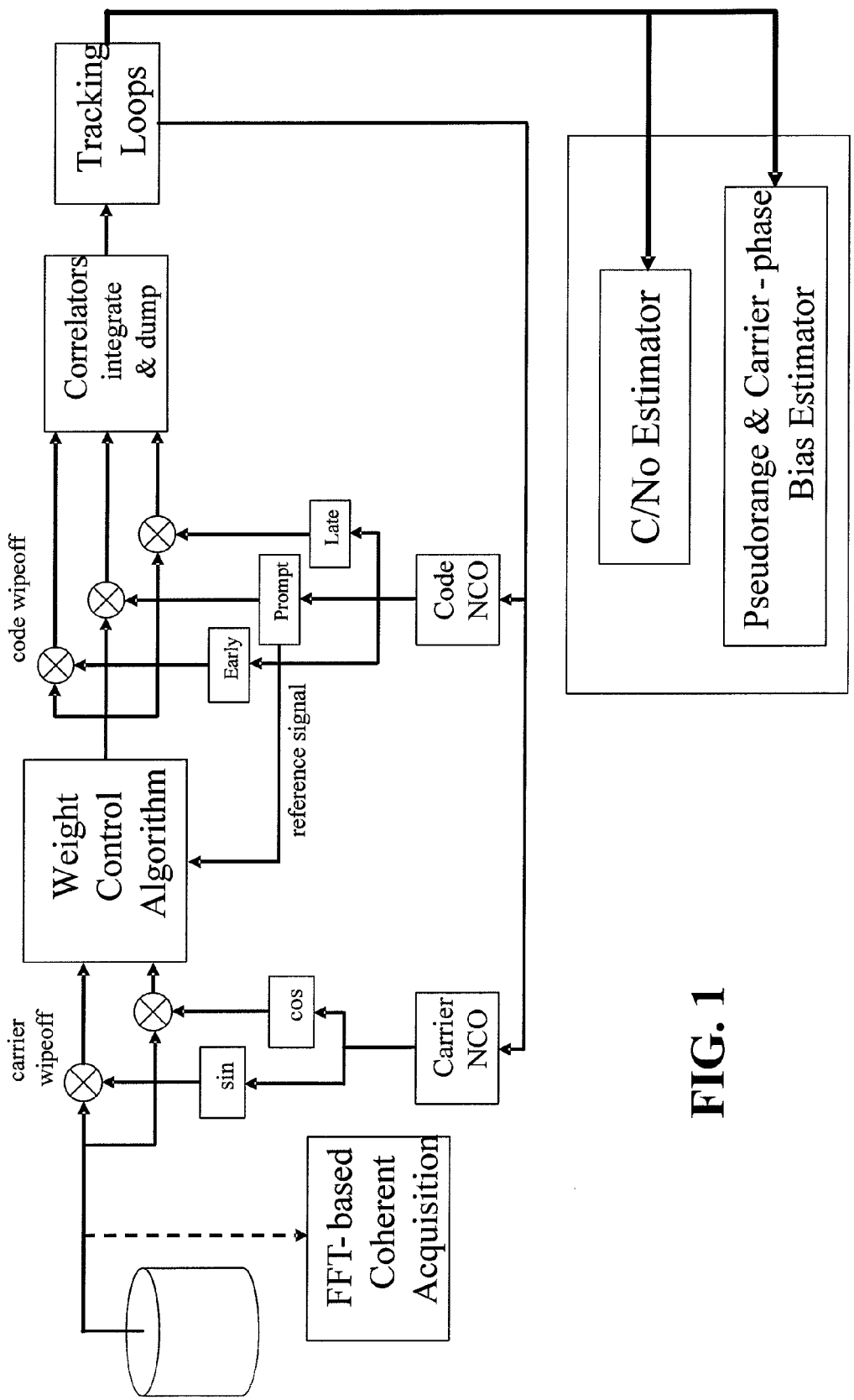
FIG. 1 shows a GPS multi-antenna space-time adaptive software receiver, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention, including that described in the claims.

DETAILED DESCRIPTION

The present invention is believed to be applicable to positioning systems and arrangements and approaches for implementing the same. While the present invention is not necessarily limited to such applications, an appreciation of various aspects of the invention is best gained through a discussion of examples in such an environment.

According to an example embodiment of the present invention, a receiver is implemented with a carrier-tracking loop and a processor for operating adaptive algorithms. A received signal is interpreted using space time adaptive processing (STAP). A number of techniques can be employed by the receiver to process the received signal. One such technique involves setting a convergence speed of the adaptive algorithms based on a noise bandwidth of a phase-locked loop (PLL) in the carrier-tracking loop. Another technique involves implementing a carrier-phase de-rotation constraint into weight parameters of the STAP to preserve spatial and temporal degrees of freedom in the STAP. These techniques and other processing techniques can be implemented alone or in combination.

Consistent with one embodiment of the present invention, a GPS receiver is implemented with an FFT-based acquisition module that performs a rapid search across Doppler frequency and code-phase for satellite signals present in the input data. Following acquisition, GPS signal processing takes place including carrier wipeoff, code wipeoff, early/prompt/late inphase and quadrature correlators, and then execution of code and carrier tracking loops. The receiver includes an adaptive weight control algorithm that can support single-antenna FRPA, multi-antenna deterministic CRPA, and space-time adaptive antenna array processing. The execution of the adaptive weight control algorithm can occur either between the carrier and code wipeoff steps, or downstream of the correlation operation.

The computation of the weight vector, whether by deterministic or by adaptive methods, can utilize information on array orientation, satellite ephemeris, and/or signal covariance. The desired characterization data for this investigation are present in the code-phase, carrier-phase, and carrier to noise ratio (C/No) estimates from receiver processing. Thus, computation of a navigation solution may not be required. Code-phase or carrier-phase biases introduced by the software receiver can be isolated to the spatial and temporal filtering of the weight control algorithm. For further details regarding specific implementations of such adaptive weight control algorithms, reference can be made to "Navigation accuracy and interference rejection for GPS adaptive antenna arrays" Thesis (Ph.D.), Stanford University, 2007, which is fully incorporated herein by reference.

Consistent with another embodiment of the present invention, a method is implemented for use in a signal-communication receiver having a carrier-tracking loop and a processor operating adaptive algorithms. The method interprets a received signal using space time adaptive processing (STAP). The convergence speed of the adaptive algorithms is set based on a noise bandwidth of a phase-locked loop (PLL) in the carrier-tracking loop. A carrier-phase de-rotation constraint is applied to weight parameters of the STAP to preserve spatial and temporal degrees of freedom in the STAP.

Figure 2:
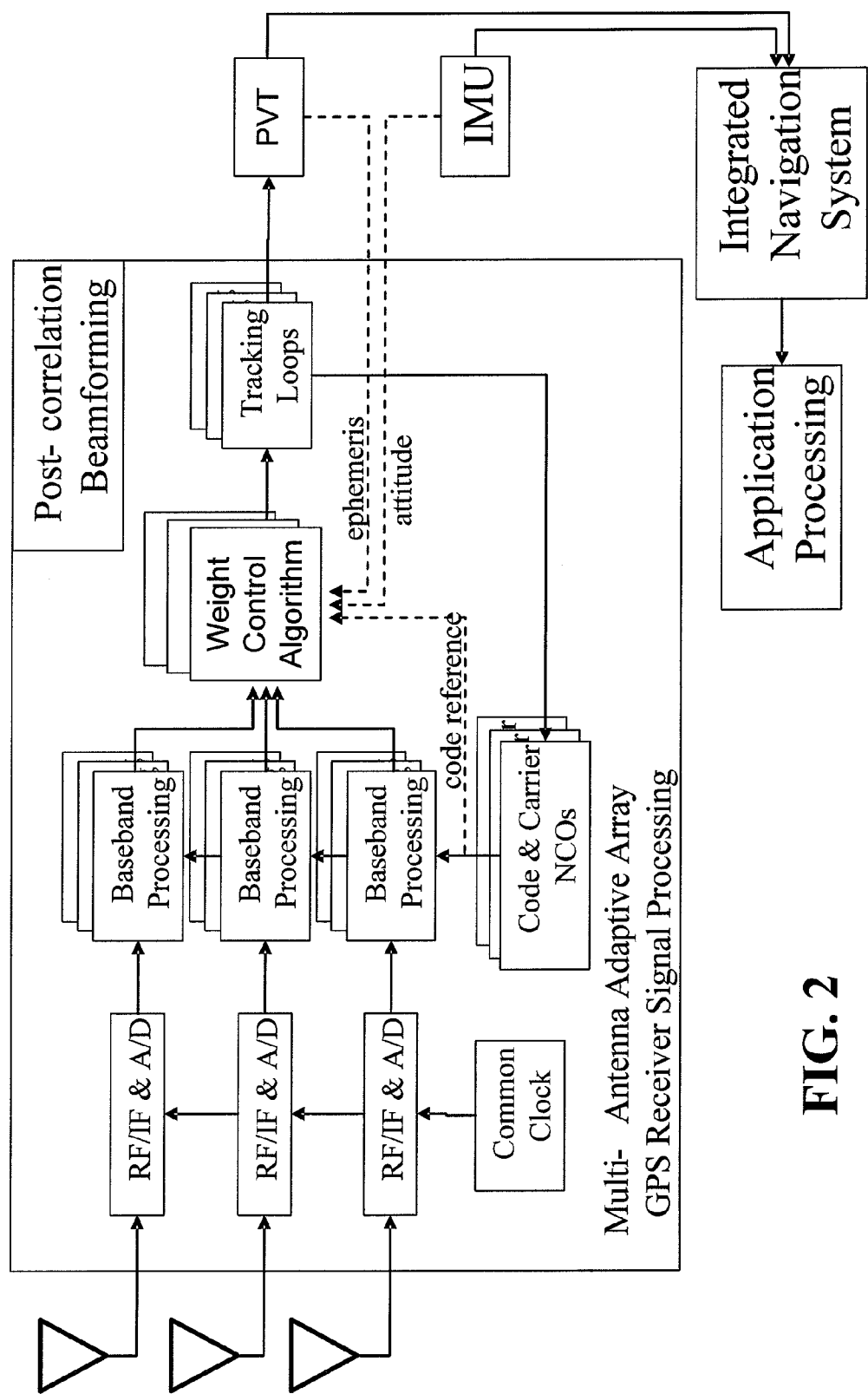
FIG. 2 shows another GPS multi-antenna space-time adaptive software receiver, according to an example embodiment of the present invention.

FIG. 1 shows a GPS multi-antenna space-time adaptive receiver, according to an example embodiment of the present invention. In a specific implementation, the receiver is implemented primarily in software. An FFT-based acquisition module performs a rapid search across Doppler frequency and code-phase for satellite signals present in the input data. Following acquisition, GPS signal processing takes place. Such processing includes carrier wipeoff, code wipeoff, early/prompt/late inphase and quadrature correlators, and execution of code and carrier tracking loops. The receiver includes a weight control algorithm which supports single-antenna FRPA, multi-antenna deterministic CRPA, and space-time adaptive antenna array processing. The execution of the adaptive weight control algorithm can occur either between the carrier and code wipeoff steps, as shown in FIG. 1, or downstream of the correlation operation as will be discussed later. In the development of antenna array processing that follows, computation of the weight vector, whether by deterministic or by adaptive means, will utilize information on array orientation, satellite ephemeris, and/or signal covariance as shown in FIG. 2.

An adaptive antenna array uses feedback to optimize some performance index. "Adaptive" in this context means that the array gain pattern adapts to the signal and noise environment, subject to (user-specified) constraints. The constraint or optimization criteria can be broadly classified either as improving the signal to interference plus noise ratio (SINR) at the array output or as decreasing the mean-square error (MSE) between the actual array output and the ideal array output. In both of these cases, the array adapts to improve (maximize) the desired signal and to reject interference.

The following discussion is directed to two example adaptation schemes, the Applebaum beamformer and the Widrow beamformer. The Applebaum beamformer, or minimum variance distortionless response (MVDR) array, is in the SINR class of methods. This algorithm constrains the array to unity gain in a particular look direction (it also may have side constraints for nullsteering), while rejecting coherent interference down to the noise floor. The Widrow beamformer is in the MSE class of methods. This algorithm seeks a weight vector that causes the array output to match a desired reference signal, while again rejecting coherent interference present at the array input. For GPS, the reference signal is the PRN code sequence and the navigation data bits (for adaptation that occurs prior to code wipeoff and accumulation), or it is just the navigation data bits (for adaptation that occurs after code wipeoff and accumulation). This method is termed a least-mean-square (LMS) approach as it uses an LMS-based error cost function.

In both the MVDR and LMS cases, the optimal steady-state weight vectors satisfy the Wiener solution. This means that for stationary signals with known autocorrelation and cross correlation statistics, the adaptive arrays minimize the mean-square error between the array output and a reference (the Wiener condition), whether that optimization is based on a beamsteering constraint (MVDR) or on a reference signal constraint (LMS). The steady-state weight vectors may be computed according to:

$$W_{MVDR} = \mu \Phi^{-1} T^* \text{ Applebaum/}MVDR$$

$$W_{LMS} = \Phi^{-1} S \text{ Widrow/}LMS$$

$T^*$ is the array steering vector, $\mu$ is a signal power scaling factor, S is the reference correlation vector, and $\Phi$ is the signal covariance matrix.

The signal covariance matrix, $\Phi$, is defined as the expected value of $X^* X^T$, where the measurement vector, X, is composed of the signals input to the adaptive array computation. For pre-correlation adaptation, X is the sample vector after carrier wipeoff (one complex sample per antenna element per time-tap). For post-correlation adaptation, X is the inphase and quadrature prompt correlator output vector (one complex correlator output value per antenna element per time-tap). In the interference-free case, the signal covariance matrix, $\Phi$, is diagonal and the adaptive weight vector, W, is equal to the constraint vector scaled according to the gain of each antenna.

The MVDR steering vector, $T^*$, is calculated given knowledge of array orientation and satellite ephemeris, and so is similar to a deterministic CRPA weight vector. The LMS reference vector, S, is the product of the sample vector, X, and the reference signal, r(t) (i.e., the PRN code sequence and/or the navigation data bit), $S = X^* \cdot r(t)$.

The solution of the above steady-state weight vectors equations involves estimation and then inversion of the covariance matrix, $\Phi$. This is the sample matrix inverse (SMI) approach. Estimation of $\Phi$ may involve significant signal buffering capacity (placing large memory demands on the receiver) and time-averaging (introducing latency and reducing the ability of the array to adapt quickly to changing interference environments), while matrix inversion requires computational complexity. However, this is an approach that has been employed successfully in adaptive beamforming and nullsteering GPS architectures.

In recursive form, these adaptive algorithms look like:

$$W_{n+1} = [I - \gamma \Phi_n] W_n + \gamma \mu T^* \text{ Applebaum/}MVDR$$

$$W_{n+1} = [I - \gamma \Phi_n] W_n + \gamma S_n \text{ Widrow/}LMS$$

With this formulation, estimation of $\Phi$ is not tied to SMI buffer size, but may be done at each sample epoch, so $\Phi_n = X_n^* X_n^T$. Thus, solving for the weight vector subject to the adaptive constraints requires no buffering or matrix inversion, and with suitable preconditioning adapts quickly and robustly to a changing signal environment.

In addition to the composite signal output calculation from following the equation, which involves multiplying the signal vector (one sample per antenna element per sampling epoch) by the complex array weight vector and then to sum over the N antenna elements in the array, there is the simple calculation of $\Phi$ at each weight update epoch, and the calculation of S for LMS.

$$s(t) = \sum_{j=1}^{N} s_j(t) \cdot w_j(t) = w^T s(t)$$

Calculation of $T^*$ can be done on a schedule commensurate either with platform dynamics or with satellite constellation motion (whichever is faster), or on the time scale of the changes in the interference environment if nullsteering constraints are implemented deterministically.

As update equations, the algorithms become:

$$*$$

$$\Delta W_n = \gamma \lfloor \mu T^* - \Phi_n W_n \rfloor \text{ Apllebaum/}MVDR$$

$$\Delta W_n = \gamma [S_n - \Phi_n W_n] \text{ Widrow/}LMS$$

$$W_{n+1} = W_n + \Delta W_n$$

This equation shows that the algorithms reach steady-state when the bracketed terms in the $\Delta W_n$ equations go to zero, i.e., when the weight vector suppresses from the covariance matrix everything but the steering or reference vector. Since only an estimate of the covariance matrix, Φ, is available, this yields an approximate solution. The misadjustment parameter γ (equivalent to 2μ in the treatment of Widrow and Steams) controls convergence speed and, as the name implies, steady-state misadjustment.

The computation of the desired array output signal (LMS) or of the array steering-vector constraint (MVDR) and the estimation of the space-time covariance matrix are specific to each receiver tracking channel. Therefore, the STAP algorithms compute weight vector coefficients that are unique to each satellite and frequency being tracked, providing the substantial increase in each channel's signal to noise ratio (SNR). In contrast, power minimization methods that do not rely either on a steering-vector constraint or on a desired reference signal may suffer if the array nulls happen to coincide with the direction of a desired incoming signal (either due to jammer nulling constraints or from array synthesis).

This brings up an interesting characteristic of the steady-state gain pattern calculated by an adaptive algorithm: the depths of the pattern nulls and the levels of sidelobes are optimized to balance interference rejection with the suppression of noise. In other words, if interference power goes up, then nulls get deeper, while if white noise power goes up, then sidelobes get smaller. Unlike white noise, every signal incident on the array (whether desirable or undesirable) is correlated in space and in time across antenna elements, lending structure to the covariance matrix. The constraint vector preserves desirable signals in the array output. However, the structure in the covariance matrix due to interference is suppressed by the adaptive algorithms. If no interference is present, then the covariance matrix is diagonal (except for the contribution from desired signals) and the expected value of the steady-state weight vector is equal to the Wiener solution.

The convergence speed of an adaptive algorithm is a tradeoff between fast convergence to react quickly to a changing signal/noise environment, and slow convergence to reduce noise in the array output due to weight vector misadjustment. Due to the high rate of weight coefficient iteration, especially for pre-correlation adaptation, convergence within tens or hundreds of microseconds is achievable. However, fast convergence speeds are beneficial only for interference environments that change on these time scales. For a GPS receiver, the selection of convergence speed can be made in view of the bandwidth of the receiver's phase-locked loop (PLL). If the interference environment is slowly changing, then there is little benefit to ultra-fast convergence in regards to the primary metric of GPS receiver tracking robustness, i.e., the resistance to a cycle slip in the carrier-tracking loop. The carrier-tracking loop represents the weakest link in the GPS receiver, and the PLL can only tolerate a limited number of corrupted carrier-phase discriminator output values before suffering a cycle slip. The maximum output from an arctangent discriminator is 90 degrees, meaning that no matter how high the J/S ratio or how little interference is rejected by the adaptive algorithm, no error larger than 90 degrees can be output by the carrier-phase discriminator. The following discussion considers several successive carrier-phase discriminator output samples all of either +90 degrees or −90 degrees, rather than a step error in the PLL of either +90 degrees or −90 degrees. This represents the absolute worst-case outcome from jamming, so this analysis is conservative.

For a 7 Hz PLL noise bandwidth (a typical value for a low-dynamics unaided GPS receiver), a second-order PLL tolerates a maximum of two navigation data bits worth of corrupted discriminator output values before a cycle slip occurs. If three navigation data bits worth of PLL discriminator output values all are corrupted to maximum extent (i.e., all either +90 degrees or −90 degrees), then a cycle slip occurs. Analysis of cycle slip probability also could be accomplished using an estimate of the tracked C/No. The present method is appropriate for the investigation of interference rejection versus navigation biases.

In view of the aforementioned considerations, for a PLL noise bandwidth of 7 Hz, the adaptive weight vector needs to reach steady-state within approximately 60 milliseconds in order to reject interference. In other words, it is desirable to correct the majority of the initial weight vector error in that amount of time. The convergence speed, however, should be compatible both with the variation speed of the interference environment as well as with the time scale of platform dynamics. If the carrier-tracking loop has a lower bandwidth than that assumed here (which is desirable and is possible with inertial aiding of the PLL), then even slower convergence of the adaptive weight vector is enabled (for example, this might apply to stationary receivers in urban environments). The adaptive weight coefficients can be plotted versus time to give an indication of their convergence behavior.

Figure 3:
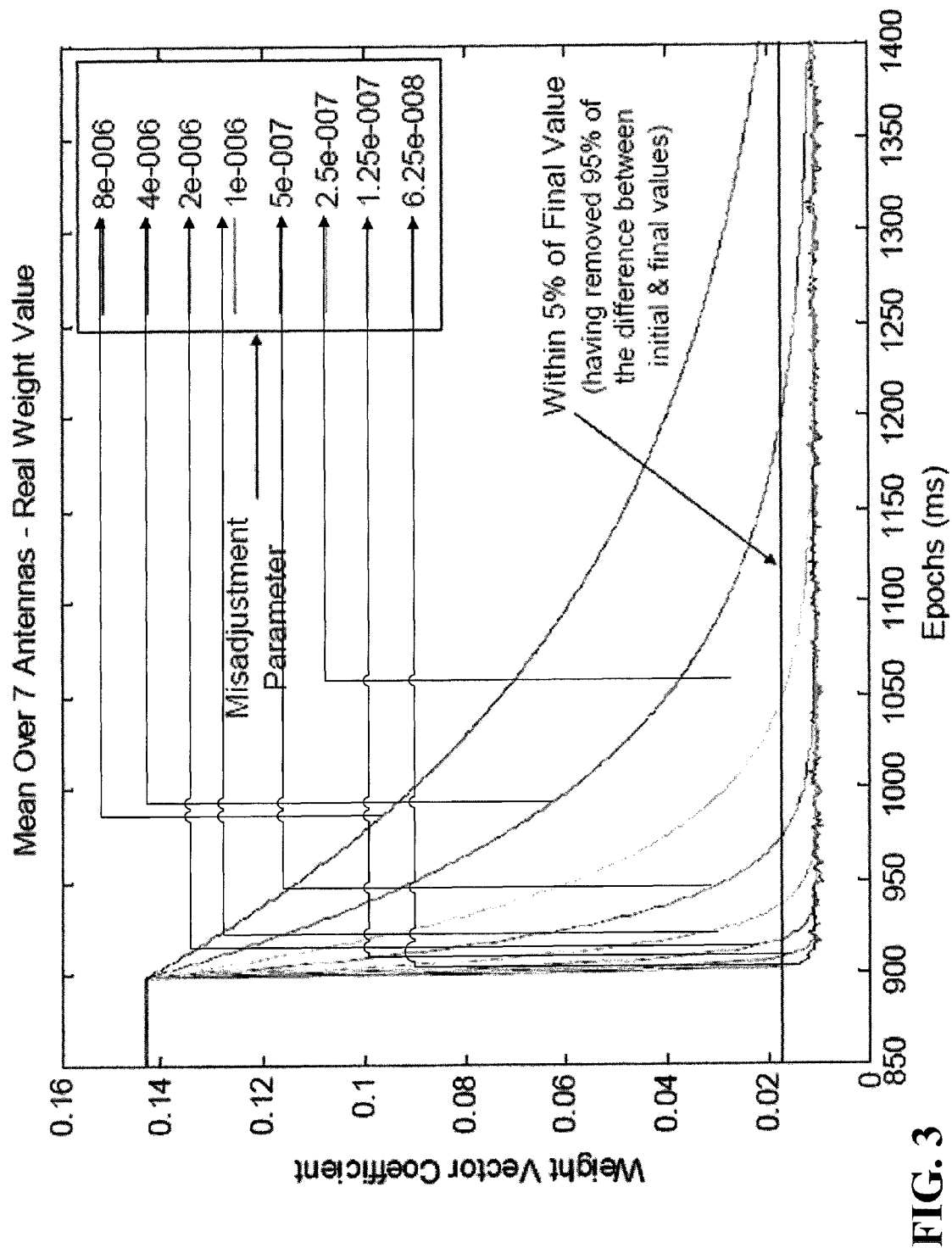
FIG. 3 shows examples of weight coefficient evolution as a function of time for pre-correlation adaptation using an LMS-based optimization criterion, consistent with an example embodiment of the present invention.

FIG. 3 shows examples of weight coefficient evolution as a function of time for pre-correlation adaptation using an LMS-based optimization criterion. The different curves in this figure are for different choices of adaptation speed, which is selected via the misadjustment parameter. The weight coefficient behavior of FIG. 3 is dependent on sampling frequency and C/No, so a simple way to choose the convergence speed parameter is through a characterization study.

Figure 4:
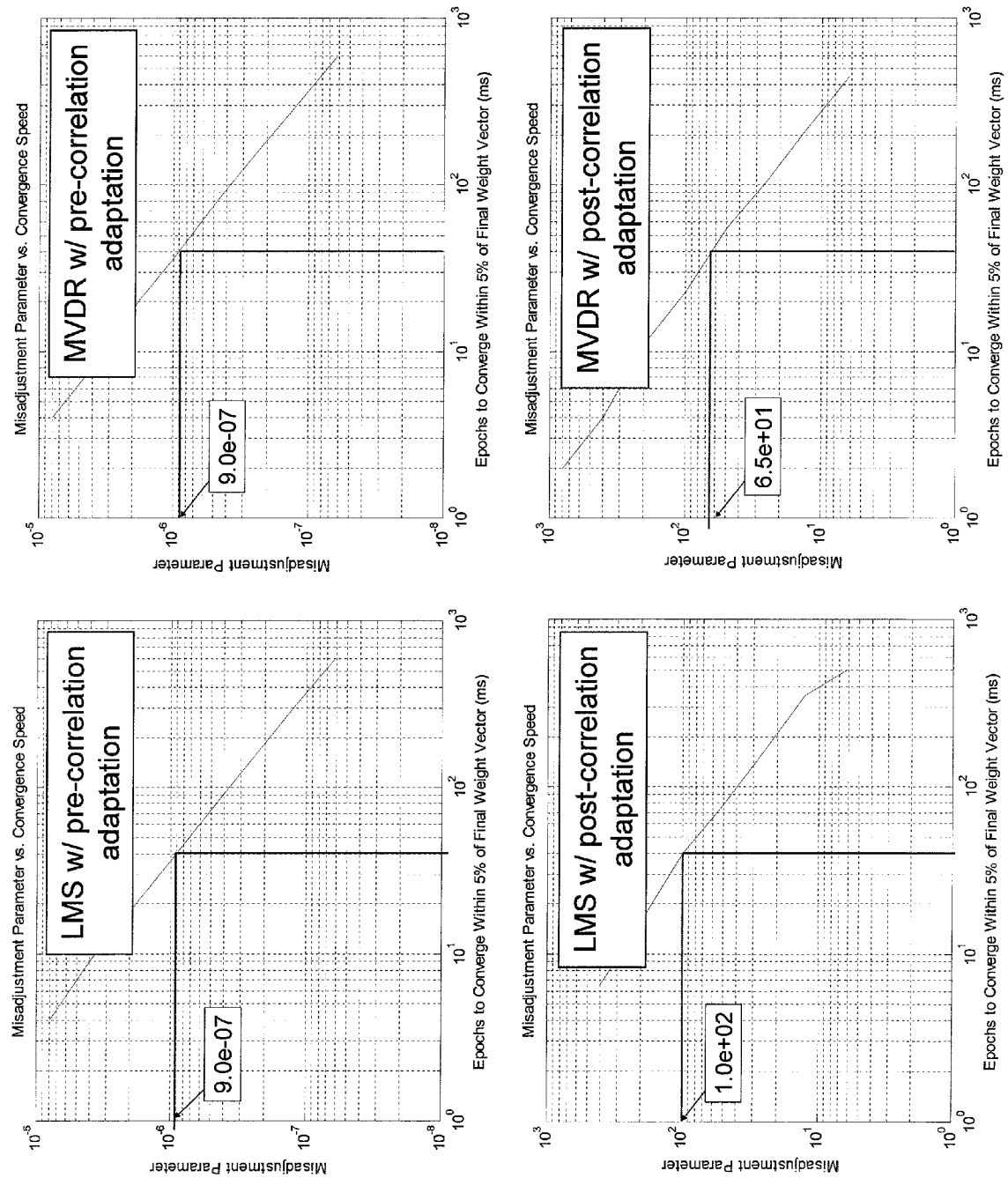
FIG. 4 shows plots of an example of convergence speeds versus misadjustment parameters both for LMS and for MVDR processing, and both for pre-correlation and for post-correlation adaptation, consistent with an example embodiment of the present invention.

FIG. 4 shows plots of an example of convergence speeds versus misadjustment parameters both for LMS and for MVDR processing, and both for pre-correlation and for post-correlation adaptation. These scenarios show data for a seven-element antenna array tracking simulated P-code signals, with fs=80 MHz and $C/N_0$=40 dB-Hz. (Note that the convergence speed versus misadjustment parameter relationship changes with the numbers of antennas and time-taps, fs, and C/No).

Figure 5:
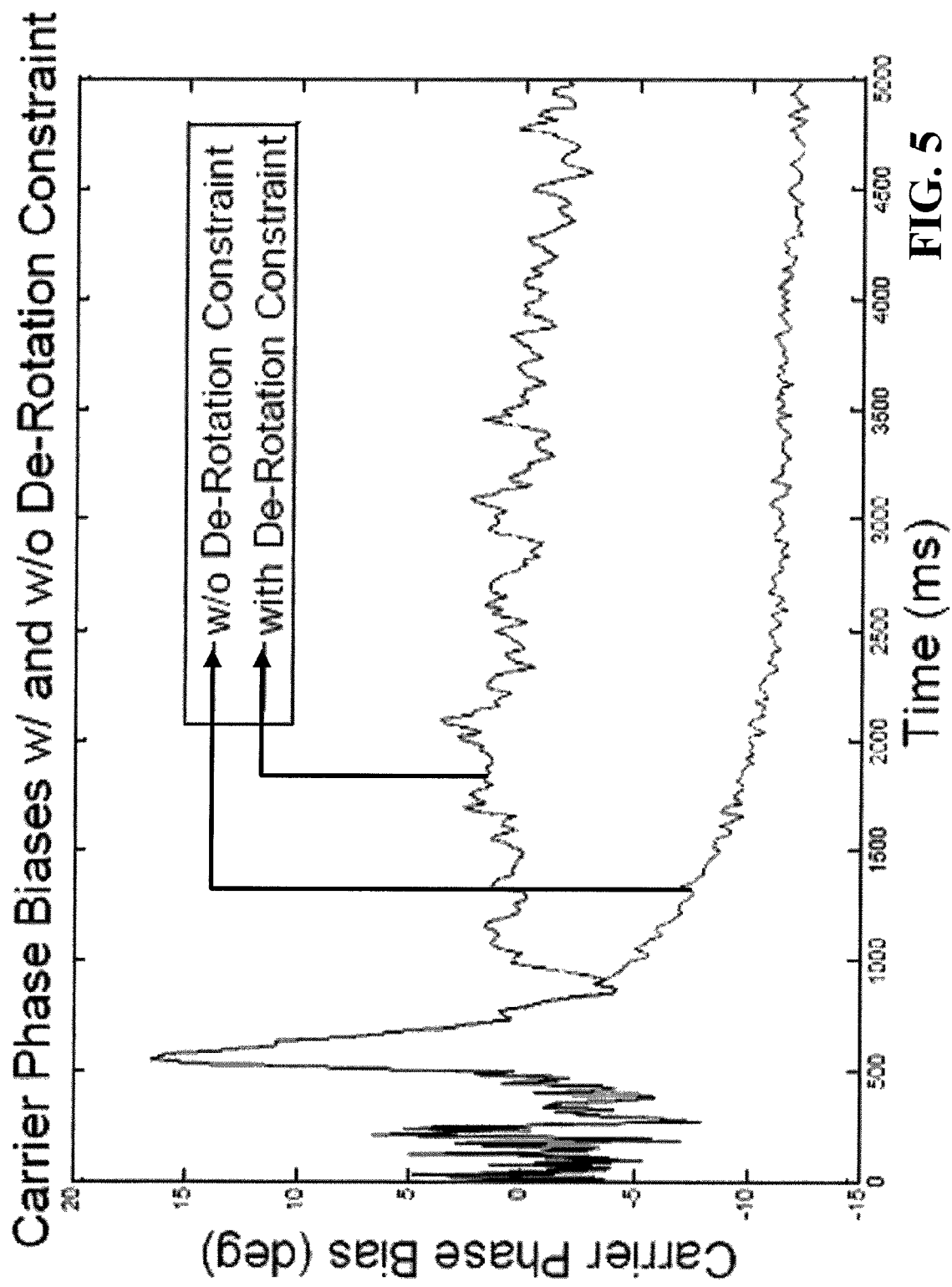
FIG. 5 shows an example drift or accumulation of carrier-phase error, consistent with an example embodiment of the present invention.

According to one embodiment of the present invention, a GPS receiver incorporates adaptive antenna array processing using two separate feedback mechanisms that alter the phase difference between the incoming satellite signal and the carrier numeric controlled oscillator (NCO): the carrier tracking loop (the PLL) and the complex coefficients of the antenna weight vector. The PLL tracks carrier-phase changes (e.g., due to satellite-to-receiver motion or receiver clock drift) and adjusts the carrier NCO to maintain phaselock between the receiver NCO and the input signal. The adaptive algorithm steers the phases of each antenna channel so that the signal-of-interest is constructively reinforced whether the optimization criteria is reference-signal-based or steering-vector-based. Since the antenna weights adapt on a time scale much faster than that of the PLL, carrier phase errors will selectively be reduced by phase adjustment in the adaptive antenna weights. Accordingly, the PLL will not detect changes in carrier-phase as it should, there will be no adjustment in the carrier NCO, and there will be an accumulation of carrier-phase error. An example of this drift or accumulation of carrier-phase error is shown in FIG. 5. In this figure, the initial carrier-phase excursion is due to tracking loop overshoot, settling, and convergence. The error is due to the apparent motion of the central element, which is solely caused by the non-zero-phase weights applied thereon.

In order to compensate for this error, a "de-rotation" constraint can be included as part of the adaptive weight computation. With this constraint method, the updated weight vector, $W_{n+1}$, is calculated as usual, but then the weight vector is rotated back such that the weight applied to the central time-tap on the master antenna element is constrained always to zero degrees of phase:

$$W_{n+1} = W_{n+1} \cdot \frac{w_j^*}{|w_j|}$$

In this equation $w_j$ is the weight vector coefficient for the central time-tap of the reference (master) antenna element. This equation "de-rotates" the updated weight vector, $W_{n+1}$.

The various embodiments of the present invention are particularly suited for implementation by a processor executing software code stored on a computer readable medium. The invention, however, need not be so limited. One or more of the functions, algorithms and/or components can be implemented in programmable logic, customized processors or discrete logic/circuits.

For further details regarding receivers, coding implementations and experimental results related to various embodiments disclosed herein, reference can be made to "Navigation accuracy and interference rejection for GPS adaptive antenna arrays" Thesis (Ph.D.), Stanford University, 2007, which is fully incorporated herein by reference.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, various aspects of the present invention may be applied for use with a variety of positional systems whether they are currently in existence or have yet to be implemented. These approaches are implemented in connection with various example embodiments of the present invention. Such modifications and changes do not depart from the true scope of the present invention, including that set forth in the following claims.

What is claimed is:

1. For use in a signal-communication receiver having a carrier-tracking loop and a processor for operating adaptive algorithms, a method for interpreting a received signal using space time adaptive processing (STAP), the method comprising at least one of:
    setting a convergence speed of the adaptive algorithms based on a noise bandwidth of a phase-locked loop (PLL) in the carrier-tracking loop; and
    implementing a carrier-phase de-rotation constraint into weight parameters of the STAP to preserve spatial and temporal degrees of freedom in the STAP.

2. The method of claim 1, wherein the method further includes the other of the steps of setting and implementing and the received signal is a signal from a global positioning system (GPS) satellite.

3. The method of claim 1, wherein the carrier-phase de-rotation constraint is such that a weight parameter applied to a central time-tap on a master antenna element is constrained to zero degrees of phase.

4. The method of claim 1, wherein the convergence speed is set to provide an expected convergence speed of the STAP that is a function of a number of corrupted carrier-phase discriminator output values necessary to cause a cycle slip.

5. The method of claim 1, wherein the method incorporates adaptive antenna array processing using two separate feedback mechanisms that alter the phase difference between an incoming satellite signal and a carrier numeric controlled oscillator (NCO).

6. The method of claim 5, wherein the two separate feedback mechanisms include a carrier tracking loop and the complex coefficients of an antenna weight vector.

7. A signal-communication receiver having a carrier-tracking loop and a processor operating adaptive algorithms for interpreting a received signal using space time adaptive processing (STAP), the receiver comprising:
    a processing block that performs at least one of:
    implementing the adaptive algorithms using a convergence speed that is based on a noise bandwidth of a phase-locked loop (PLL) in the carrier-tracking loop and
    implementing a carrier-phase de-rotation constraint into weight parameters of the STAP to preserve spatial and temporal degrees of freedom in the STAP.

8. The receiver of claim 7, wherein the processing block further performs the other of setting and implementing and the received signal is a signal from a global positioning system (GPS) satellite.

9. The receiver of claim 7, wherein the carrier-phase de-rotation constraint is such that the weight parameter, as applied to a central time-tap on a master antenna element, is constrained to zero degrees of phase.

10. The receiver of claim 7, wherein the convergence speed is set to provide an expected convergence speed of the STAP that is a function of a number of corrupted carrier-phase discriminator output values necessary to cause a cycle slip.

11. The receiver of claim 7, wherein the processing block incorporates adaptive antenna array processing using two separate feedback mechanisms that alter the phase difference between an incoming satellite signal and a carrier numeric controlled oscillator (NCO).

12. The receiver of claim 11, wherein the two separate feedback mechanisms include a carrier tracking loop and the complex coefficients of an antenna weight vector.

13. A computer-readable storage medium, for use in a signal-communication receiver having a carrier-tracking loop and a processor for operating adaptive algorithms, configured with software that when executed by a processor implements a method for interpreting a received signal using space time adaptive processing (STAP), the method comprising at least one of:
    setting a convergence speed of the adaptive algorithms based on a noise bandwidth of a phase-locked loop (PLL) in the carrier-tracking loop; and
    implementing a carrier-phase de-rotation constraint into weight parameters of the STAP to preserve spatial and temporal degrees of freedom in the STAP.

14. The storage medium of claim 13, wherein the received signal is a signal from a global positioning system (GPS) satellite.

15. The storage medium of claim 13, wherein the carrier-phase de-rotation constraint is such that the weight parameter, as applied to a central time-tap on a master antenna element, is constrained to zero degrees of phase.

16. The storage medium of claim 13, wherein the convergence speed is set to provide an expected convergence speed of the STAP that is a function of a number of corrupted carrier-phase discriminator output values necessary to cause a cycle slip.

17. The storage medium of claim 13, wherein the method incorporates adaptive antenna array processing using two separate feedback mechanisms that alter the phase difference between an incoming satellite signal and a carrier numeric controlled oscillator (NCO).

18. The storage medium of claim 17, wherein the two separate feedback mechanisms include a carrier tracking loop and the complex coefficients of an antenna weight vector.

* * * * *